United States Patent [19]
Oberthur

[11] 3,779,390
[45] Dec. 18, 1973

[54] FILTER ASSEMBLY

[75] Inventor: Heinrich Oberthur, Offenbach-Rumpenheim, Germany

[73] Assignee: Itt Industries, Inc., New York, N.Y.

[22] Filed: May 18, 1972

[21] Appl. No.: 254,450

[52] U.S. Cl. ............................ 210/495, 210/497
[51] Int. Cl. .................................... B01d 29/30
[58] Field of Search .............. 55/498; 210/448, 210/450, 452, 455, 495, 497

[56] References Cited
UNITED STATES PATENTS

| | | | |
|---|---|---|---|
| 2,153,664 | 4/1939 | Freedlander | 210/495 |
| 3,332,557 | 7/1967 | Pall | 210/497 |
| 2,598,818 | 6/1952 | Muirhead | 210/450 |
| 2,658,625 | 11/1953 | Rafferty | 210/497 |

*Primary Examiner*—Samih N. Zaharna
*Assistant Examiner*—Peter A. Hruskoci
*Attorney*—C. Cornell Remsen, Jr. et al.

[57] ABSTRACT

A filter assembly including a cylindrical wire mesh having a cylindrical apertured plastic cage therearound. The mesh is embedded in the plastic for support.

2 Claims, 4 Drawing Figures

FILTER ASSEMBLY

BACKGROUND OF THE INVENTION

This invention relates to the fluid handling art, and more particularly, to wire screen filters.

In the past, it has been difficult and expensive to make and install cylindrical wire screens for use as filters in fluid flow systems.

SUMMARY OF THE INVENTION

In accordance with the device of the present invention, the above-described and other disadvantages of the prior art are overcome by providing a cylindrical screen embedded in an apertured plastic cage.

According to another feature of the invention, the cage is also molded onto a mounting flange.

A fine wire mesh formed to a hose is cast into a plastic cylinder closed by a bottom, said plastic cylinder having several apertures on its peripheral surface. An annular-shaped metal shoulder is provided at the open end of the plastic cylinder, said metal shoulder in its inclination following the inclination at the transition between the pressure medium bore and the thread connection bore.

The apertures can be rectangular and are distributed evenly on the periphery of the filter insert piece.

The diameter of the plastic cylinder is smaller than that of the pressure medium bore in which it is to be inserted. A collar is cast on the open end of the filtering surface, said collar fitting glidingly into the pressure medium bore; the metal shoulder is cast via its inner periphery into the external end of the filter insert piece.

The filtr insert piece can be clamped sealingly via the inclined annular-shaped metal shoulder between the inclination at the transition between pressure medium bore and at the end of a pipe line coupling or a hose coupling.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
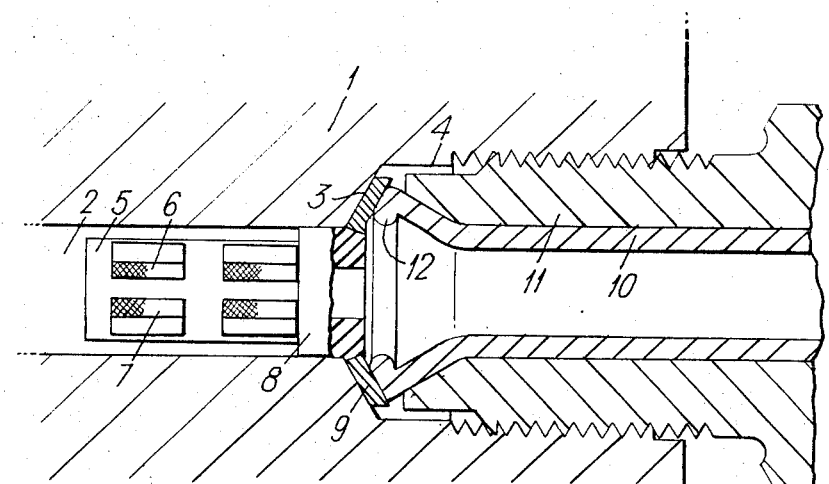
FIG. 1 is a longitudinal sectional view of the inventive filter insert piece with regard to a pipe connection of the pressure medium line with the housing of a hydraulic device.
Figure 2:
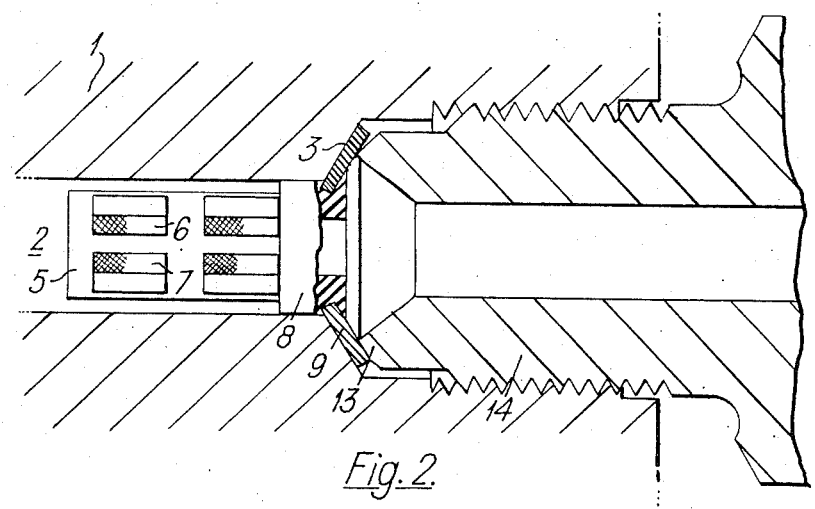
FIG. 2 is a longitudinal sectional view of the same filter insert piece with regard to a hose connection of the pressure medium line.

Both FIGS. 1 and 2 show the housing 1 of a hydraulic device. In this view of a cylindrical bore 2 serving as pressure medium line is provided, said bore 2 opening via a frusto-conical surface 3 into an internally threaded counter bore 4 for the connection of the pressure medium connection from the outside.

The filter insert piece or assembly includes a fine wire mesh which is rolled into a cylindrical mesh 7. This cylindrical mesh 7 is partially covered with plastic by preformed and apertured, axially split cylinder halves or by injection molding the plastic to the shape of an articulated cage or apertured cylinder 5 shown in FIGS. 1—4. By heating the preforms while under pressure or by injection molding, the plastic fills the interstices over certain mesh areas and the mesh becomes fixed relative to the plastic because it is at least partially embedded therin.

The surface of said cylinder 5 has four apertures 6.

The outside diameter of cylinder 5 is smaller than the inside diameter of the pressure medium bore 2. The plastic cylinder 5 closes one end of wire mesh cylinder 7. Cylinder 5 has an integral collar which fits slidingly in the pressure medium bore 2. During the molding process described hereinbefore, the collar 8 is molded to the inside rim of an annular metal shoulder 9, the conical angle of said metal shoulder 9 being the same as the conical angle of the surface 5 at the transition of the pressure medium bore 2 into the counterbore 4.

FIG. 1 shows the inserted filter insert piece described above being used with a pipe connection. A pressure medium pipe 10 is connected in the known manner via a pipe line coupling 11 which is screwed into the counterbore 4. The free end 12 of the pressure medium pipe 10 projects to a certain extent from the pipe line coupling 11 and is flanged.

If the filter insert piece is inserted in the pressure medium bore until the metal shoulder 9 rests on the surface 3, and if subsequently the pipe line coupling 11 is screwed into the counterbore 4, the flanged end 12 of the pressure medium pipe 10 will come to rest sealingly against the surface of the metal shoulder 9 and press it sealingly against the surface 3. The filter insert piece is thus kept in place.

FIG. 2 shows the same filter insert piece being used with a hose connection. The inclined end 13 of the hose coupling 14, known per se, also comes to rest against the metal shoulder 9 of the filter insert piece, when screwed in, and clamps the filter insert piece.

The invention allows the arrangement of a filter in a line or a line connection respectively of conventional type without structural changes and without special auxiliary and fixing means.

Figure 4:
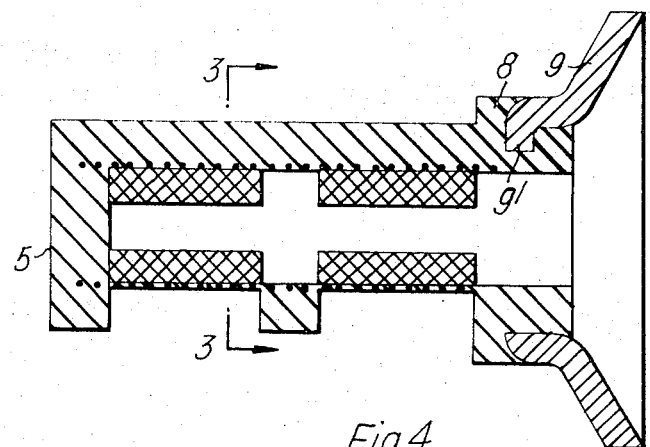
FIG. 4 is a longitudinal sectional view of the filter insert piece taken on the line 4—4 shown in FIG. 3.
Figure 3:
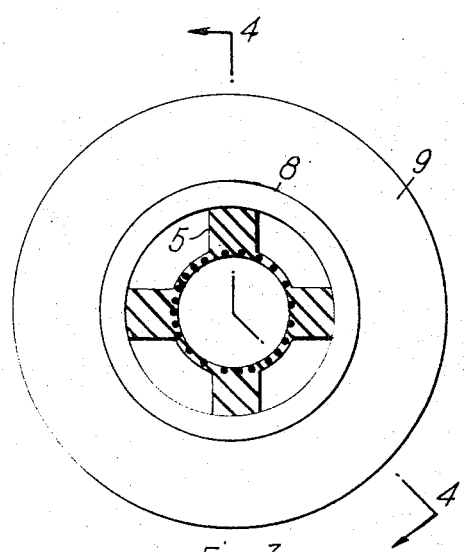
FIG. 3 is a transverse sectional view of the filter insert piece taken on the line 3—3 shown in FIG. 4.

The direction of flow in FIGS. 1, 2 and 4 may be either to the right or to the left, and in FIG. 3, the flow may be either radially inward or radially outward, respectively.

The changing of the filter is effected in the most simple and rapid manner as possible.

The medium coming from the connected pipe or hose line is bound to pass through the fine wire mesh 7 and the apertures 6 of the supporting plastic cylinder 5 into the remaining space between the plastic cylinder 5 and the wall of the pressure medium bore 2.

Shoulder 9 has three angularly spaced and equally spaced projections 9' to hold collar 8 in a fixed position relative thereto.

What is claimed is:

1. A filter assembly comprising: a cylindrical wire mesh; a cylindrical plastic cage enclosing said mesh and molded into the interstices thereof to prevent movement thereof, said cage generally enclosing all of said mesh except one end thereof, said cage having at least one hole therethrough in registration with a portion of said interstices to permit fluid flow from the interior of said mesh to the exterior thereof and vice versa through said portion; and means fixed relative to said cage for mounting said cage in a position such that fluid can enter or exit the interior of said mesh through said one end thereof.

2. The invention as defined in claim 1, wherein said means is an apertured frusto-conical disc having said plastic at said one mesh end molded around the inside edge of said disc in a fluid tight manner.

* * * * *